United States Patent [19]
O'Brien

[11] 4,117,409
[45] Sep. 26, 1978

[54] SIGNAL SAMPLING SYSTEM

[75] Inventor: Edwin L. O'Brien, Fullerton, Calif.

[73] Assignee: Hughes Aircraft Company, Culver City, Calif.

[21] Appl. No.: 790,525

[22] Filed: Apr. 25, 1977

Related U.S. Application Data

[63] Continuation of Ser. No. 640,600, Dec. 11, 1975, abandoned.

[51] Int. Cl.² .............................................. H03K 5/00
[52] U.S. Cl. .................................... 328/151; 307/238; 328/56; 340/347 SH
[58] Field of Search ................. 328/151, 56; 307/238; 340/347 SH

[56] References Cited
U.S. PATENT DOCUMENTS

| | | | |
|---|---|---|---|
| 2,891,171 | 6/1959 | Shockley | 307/238 |
| 3,183,448 | 5/1965 | Strother, Jr. et al. | 328/56 |
| 3,491,304 | 1/1970 | Justus et al. | 328/151 |
| 3,638,007 | 1/1972 | Brooks | 328/151 |
| 3,639,846 | 2/1972 | Justice | 328/151 |

*Primary Examiner*—Stanley D. Miller, Jr.
*Assistant Examiner*—B. P. Davis
*Attorney, Agent, or Firm*—Walter J. Adam; W. H. MacAllister

[57] ABSTRACT

A system utilizing a tapped or recirculating delay line to effectively slow down a time duration limited signal such that it may be sampled at a slower rate yet preserve all the inherent information in the signal which may have a bandwidth higher than the inverse of the sampling rate. In the systems of the invention a selected number of delayed signal replicas are formed and sampled at selected intervals consistent with the A/D (analog to digital) converter capability. The delay per tap or the delay of the recirculating delay section is made larger than the time duration limited period and the output sampling interval is made equal to the delay per tap (or of the recirculating delay section) ± the input sampling interval all divided by the number of samples per signal replica. The number of sections of the tapped delay line or the number of recirculations may be selected to either provide a consecutive sampling sequence of the gated input pulse or a group of samples out of sequence which may be stored and identified after passing through an A to D converter. Thus a wideband time gated signal may be sampled at a relatively low speed and with a sampling device having a relatively small degree of complexity.

17 Claims, 5 Drawing Figures

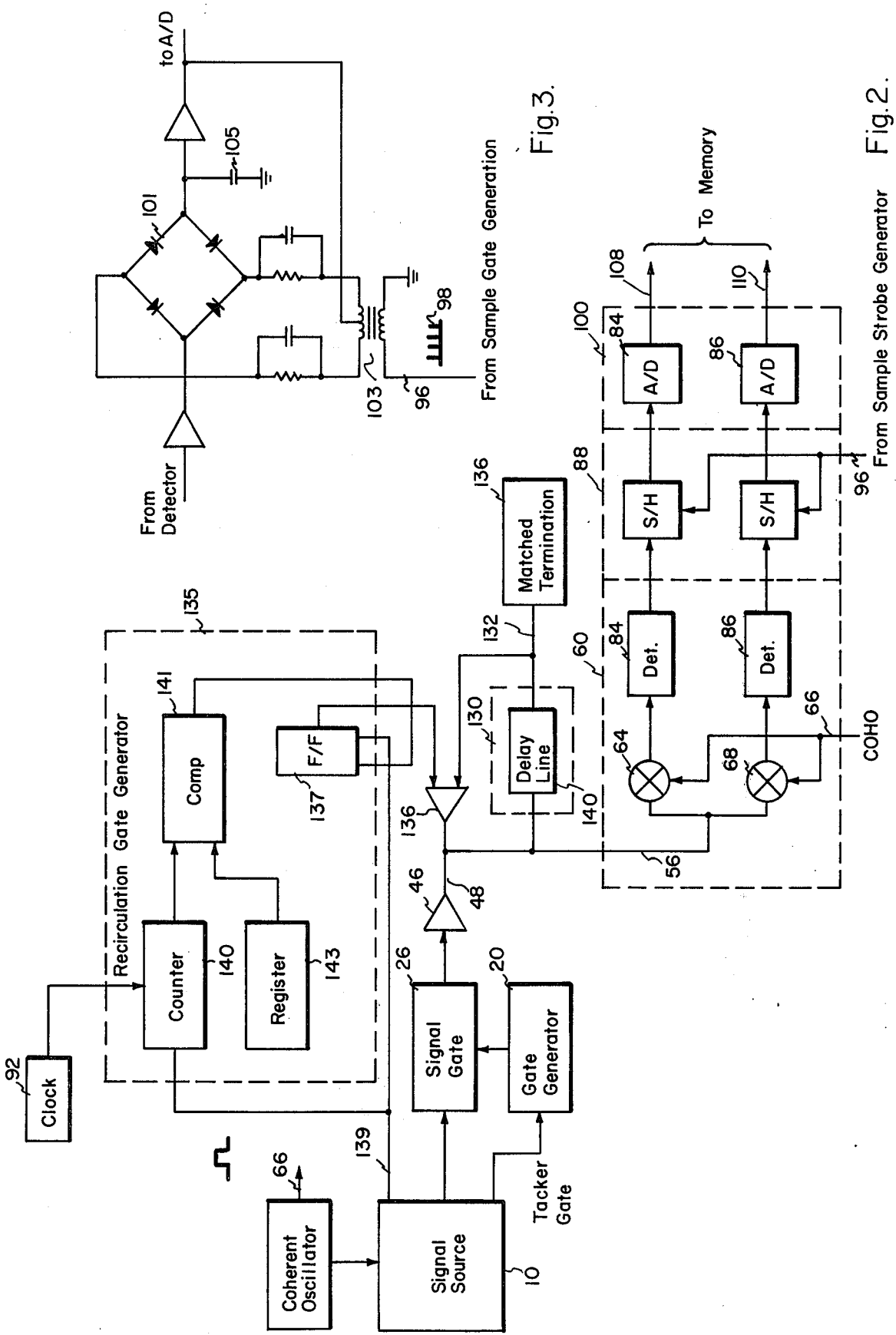

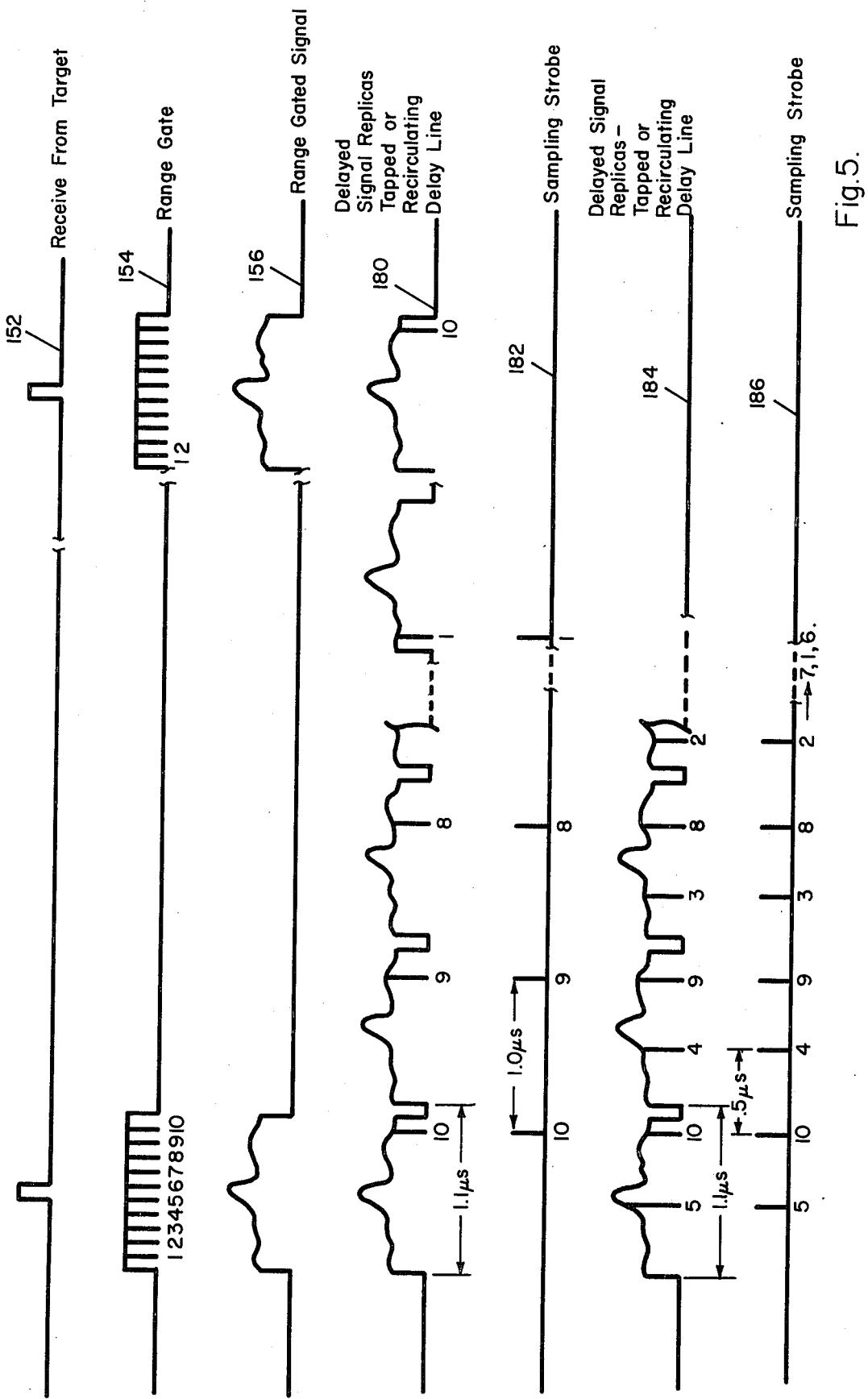

SIGNAL SAMPLING SYSTEM

The invention herein described was made in the course of or under a contract or subcontract thereunder with the Department of the Army.

This is a continuation of application Ser. No. 640,600 filed Dec. 11, 1975 now abandoned.

BACKGROUND OF THE INVENTION

1. Field of the Invention

This invention relates to signal sampling systems such as may be utilized in a radar system or in a passive reception system and particularly to an arrangement that provides sampling of a wideband signal at a slow rate so as to simplify the sampling and conversion circuits.

2. Description of the Prior Art

In systems such as radar systems receiving a signal to be sampled within an enable gate such as a relatively wide range gate it is often necessary to sample the range gated pulse at closely spaced intervals in order to provide range information and other characteristics of the received signal. When the signal being sampled is a wideband signal it has been found that the high rate of sampling required to detect the signal within the range gate is often substantially greater than the converting circuit such as the A to D converter can handle without either utilizing a substantially complex and expensive A to D converter or utilizing a multiplexing arrangement with a plurality of A to D converters. As is well known in the art, A to D converters because of the settling time of the switches and delay in the digitizing circuits require relatively complex and expensive circuits in order to operate at high speeds. It would be of substantial advantage to the radar art and other applicable fields if sampling of wideband time gated signals could be performed at a slow rate to allow utilization of inexpensive sample output devices.

SUMMARY OF THE INVENTION

Briefly the system of this invention utilizes a tapped or recirculating delay line to effectively slow down a time duration limited or range gated signal so as to provide a plurality of signal replicas and sample at a slower rate while preserving all of the inherent information in the signal. In the arrangements in accordance with this invention, the tap spacing is selected greater than the delayed replica so that a sample from each of the selected sample intervals may be provided at a common output. The tap spacing or recirculating delay line is selected to provide an interval larger than the range gate and the output sampling interval is selected equal to the delay per tap (or the delay of the recirculating delay line) ± the input sampling interval, all divided by the number of samples per signal replica. If the range gated signal is shorter in duration than the output sampling interval, the delay line may be selected to obtain one sample from each of the delayed signal replicas so as to provide a sample sequence in the order of (or reverse order of) reception of the segments of the range gated signal. If the range gated signal is longer in duration than the output sampling interval, the delay line may be selected to sample multiple samples from each delayed replica by sampling segments out of sequence from the sample intervals of the received range gated signal. The samples when out of time sequence have a fixed and repetitive order so that they are readily identifiable. Thus a wideband time gated signal may be sampled at a slow speed so as to allow use of simplified processing circuits such as A to D converters.

OBJECTS OF THE INVENTION

It is therefore an object of this invention to provide effective sampling of a wideband short duration signal.

It is another object of this invention to provide effective sampling of a signal which may have a bandwidth higher than the inverse of the sampling rate provided by the circuits of the system.

It is a further object of this invention to allow sampling of a wideband time gated signal utilizing relatively simple output circuits such as A to D converters.

It is a still further object of this invention to provide sampling of a time duration limited or range gated informational signal at a relatively slow rate while preserving all the inherent information in the signal.

It is another object of this invention to provide a sampling system for extracting information from a range gated signal that provides a relatively simple and inexpensive overall sampling and conversion system.

BRIEF DESCRIPTION OF THE DRAWINGS

The novel features of this invention as well as the invention itself both as to its organization and method of operation, will best be understood from the accompanying drawings, taken in connection with the accompanying description, in which like reference characters refer to like parts and in which:

FIG. 2 is a schematic block diagram of the recirculating delay signal sampler in accordance with the invention.

FIG. 3 is a schematic circuit diagram of a sample and hold circuit that may be utilized in the systems of FIG. 1 and FIG. 2, FIG. 5 is a diagram of waveforms showing voltage as a function of time for further explaining the operation of the systems of FIGS. 1 and 2.

DESCRIPTION OF THE PREFERRED EMBODIMENT

Figure 1:
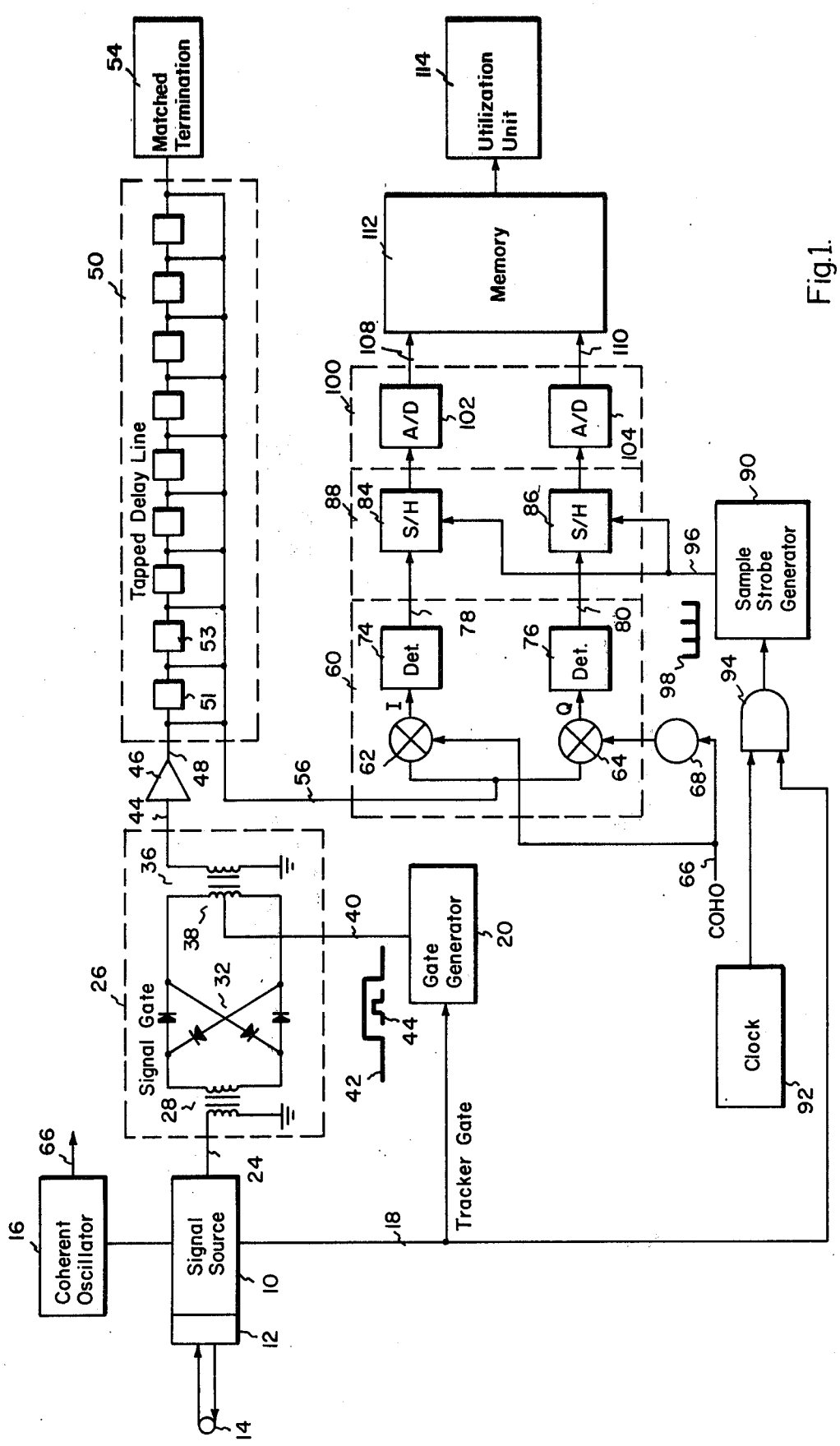
FIG. 1 is a schematic block and circuit diagram of the tapped delay line and signal sampler in accordance with the invention.

Referring first to FIG. 1 the signal sampling system may receive signals from a suitable source 10 which for example may be an active type system such as a radar system, laser system or sonar system transmitting energy from a suitable antenna 12 to an object such as 14 of which information may be wished to be sampled. The signal source 10 may also be a passive type reception system such as an infrared system or an optical system or may represent any source of relatively wideband width data. For coherent systems such as radar or laser systems a coherent oscillator 16 may control the frequency of the transmitted and processed signal as well as provide a signal for mixing of the sample signal. It is to be understood that the principles of the invention are not limited to coherent type systems but are equally applicable to uncoherent systems where for example only the amplitude of the received energy is desired to be utilized. The source 10 also may provide range tracking, well known in the art, to provide a pulse on an output lead 18 to be utilized in a time duration limited gate or gate generator 20. The received signal on an output lead 24 all within the scope of the invention may be either a video signal or a signal at IF frequency, with the signal at video being in a single channel without containing phase information as is well known in the art. A signal gate 26 includes as part of an illustrated circuit that may be utilized, a transformer 28 responsive to the signal on a lead 24 to apply the signals through a diode switching network 32 to a transformer 36 having a center tapped primary winding 38 responsive through a lead 40 to a range gate pulse 42 from a gate generator 20. The received signal 44 from the target is included in the range gate pulse 42 and is to be sampled during this interval.

The time duration limited or range gated signal is applied from the signal gate 26 through a lead 44 and a delay line driver 46 to a lead 48 and is in turn applied to a tapped delay line 50. In the illustrated arrangement the delay 50 is shown to have 10 taps with nine delay line segments and with the output coupled to a matched termination unit 54. The delay line 50 in the illustrated system is selected to provide 10 samples during the period of the range gate 42 with each of the 10 samples being in time sequence and applied to a common output lead 56. The delay line 50 may be any suitable type of delay line such as a tapped surface wave delay line which presently has an operating range of frequencies between about 10 to 300 megahertz or may be a reflective type delay line which has a relatively high frequency such as a quartz delay line either with the units coupled in cascade without tapping or with other suitable tapping arrangements. Tapped surface wave delay lines are well known in the art such as described on page 1091 of an article "Surface-Acoustic-Wave Components, Devices And Applications" by J. D. Maines et al. in proc. IEEE, Vol. 120, No. 10R, October 1973, IEE Reviews. At low frequencies such as below about 10 megahertz the delay line 50 may be an LC type delay line circuit and for short delays may be a coaxial type delay line. If the losses permit the delay line 50 for example may be a bulkwave type using a suitable material such as sapphire or diamond with each section interconnected to provide the tapping therefrom. If the signal on the lead 48 is a video signal without a carrier then a charged coupled device delay line may be utilized if the bandwidth characteristics therein are suitable. For a surface wave delay line the termination 54 may be provided by any suitable glossy material.

The signal on the lead 56 is then applied to a detector circuit 60 which if the delay line 50 is receiving signals at IF frequencies includes an I (in phase) channel and a Q (quadrature) channel each having a mixer 62 and 64 responsive to the coherent oscillator signal on a lead 66 from the coherent oscillator 16. The in phase channel receives the lead on the signal 66 directly and the mixer 64 in the quadrature channel receives the signal in the lead 66 after passing through a 90° phase shifter 68. The signals provided by the mixers 62 and 64 are applied to respective amplitude detectors 74 and 76 to apply quadrature related video signals on respective output leads 78 and 80. If the signal on the lead 56 is at a video frequency, the circuit 60 includes a single amplitude detector without the requirement of the I and Q channels and applies the amplitude information without phase information to the output thereof. It is to be understood that the principles of this invention are equally applicable to the system providing the sampling at either intermediate frequency or at video frequency.

The signal on the leads 78 and 80 is then applied to respective sample and hold circuits 84 and 86 of a sample and hold unit 88, which in video operation includes only a single sample and hold circuit. A sample strobe generator 90 responds to a combination of a tracker gate signal on the lead 18 and a clock signal from a clock source 92 applied through a suitable coincidence gate 94 to apply sample strobe pulses of a waveform 98 through a lead 96 to the sample and hold circuits 84 and 86. Sample strobe pulses of the waveform 98 are thus provided in coincidence with the timing of the delay line 50 to apply the sampled analog signals to an A to D converter unit 100 including A to D converters 102 and 104. Because of the delayed sampling rate the system in accordance with the invention allows the A to D converters 102 and 104 to operate at a relatively slow rate. The A to D converters may be of any suitable type such as one using a sub-ranging technique and described in the magazine "EDN" of June 5, 1973 on page 62 in an article entitled "High Speed, High Resolution H/D Converters: Here's How", By David Benima and James R. Barger, or one utilizing the technique shown on pages 39 to 43 of the IEE National Convention Record, New York, March, 1966. If the delay line is operating at video a single A to D converter may be utilized. Also the A to D converter 100 may include several converters and a multiplexing arrangement for time sharing to accommodate certain sample rates and A/D converter types.

Digital signals are then applied from the A to D converters 102 and 104 through respective composite leads 108 and 110 to a suitable memory or storage unit 112 which has appropriate input or output addressing to correspond with the sequence of the samples provided on the lead 56. The stored data is then applied to suitable utilization units such as a utilization unit 114 where if the sampling at the delay line 50 is done at the intermediate frequency, information such as amplitude and doppler frequency may be derived therefrom or if the delay line operates at video frequency amplitude and position information may be derived therefrom.

Referring now to FIG. 3 a suitable sample and hold circuit 84 and 86 is illustrated including a diode bridge network responsive to and amplified signal from the detector and with a transform 103 having a secondary winding coupled across the diode bridge network. The output of the diode network is coupled to a storage capacitor 105 having its other terminal coupled to ground with the output coupled through a buffer amplifier to the analog to digital converter. Resistors are coupled between the secondary winding and the diode network to bleed the charge off between pulses and high frequency bypass capacitors are coupled in parallel with the resistors. A lead is coupled between a center tap of the secondary winding and the output lead so that the transformer is boot strapped to the output signal. The primary winding of the transformer 103 receives the gating pulses of the waveform 98. The illustrated sample and hold circuit which has a relatively long time constant is responsive to a predetermined voltage charge of the input signal.

Before further explaining the operation of the signal sampling concepts in accordance with the invention, reference is now made to FIG. 2 showing the recirculating delay line sampling arrangement. The illustrated system is similar to that of FIG. 1 except for the signal delay portion and an illustrated recirculation gate generator. The signal delay portion includes a delay line 130 coupled to the input lead 48 and coupled to an output lead 132 which in turn is coupled to a matched termination unit 136. The feedback path is coupled from a lead 132 through a gated amplifier 136 to the lead 48. Depending on the number of required recirculations a gate generator responsive to the tracker gate or one of other selected durations may be utilized in both FIG. 2 as well as FIG. 1. The illustrated recirculation gate generator 135 includes a flip flop 137 set by a pulse on a lead 139, which pulse may be the selected clock pulse that initiates the tracker gate pulse, for example. A counter 140 may be started in response to the signal on the lead 139 and clock pulses from the clock source 92 to apply count values to a comparator 141, also receiving a predetermined value from a register 143. When the predetermined value is reached, the comparator 141 resets the flip flop 137 and terminates a gating pulse being applied to the gated amplifier 136. Recirculation thus only occurs during the time gated interval provided by the flip flop 137. The delay line 130 which does not require a tap in the illustrated arrangement includes a delay section 144 which may have a delay larger than the time gating interval of the gate generator 20. The delay of the delay section is equal to the delay per tap previously described. The delay line 144 may be any suitable type as described relative to the delay line 50 of FIG. 1 such as a surface wave delay line, a charge coupled device delay line if the sampling is done at video frequencies and an electro magnetic delay such as a lump parameter delay line or a bulk wave delay such as sapphire or diamond structure as is well known in the art. It is to be understood that the signal sampling arrangement utilizing the recirculation through the delay line 130 may sample a signal at any frequency such as video or an intermediate frequency with the units 60, 88 and 100 being appropriately modified to a single channel if the sampling is done at video frequency.

Figure 4:
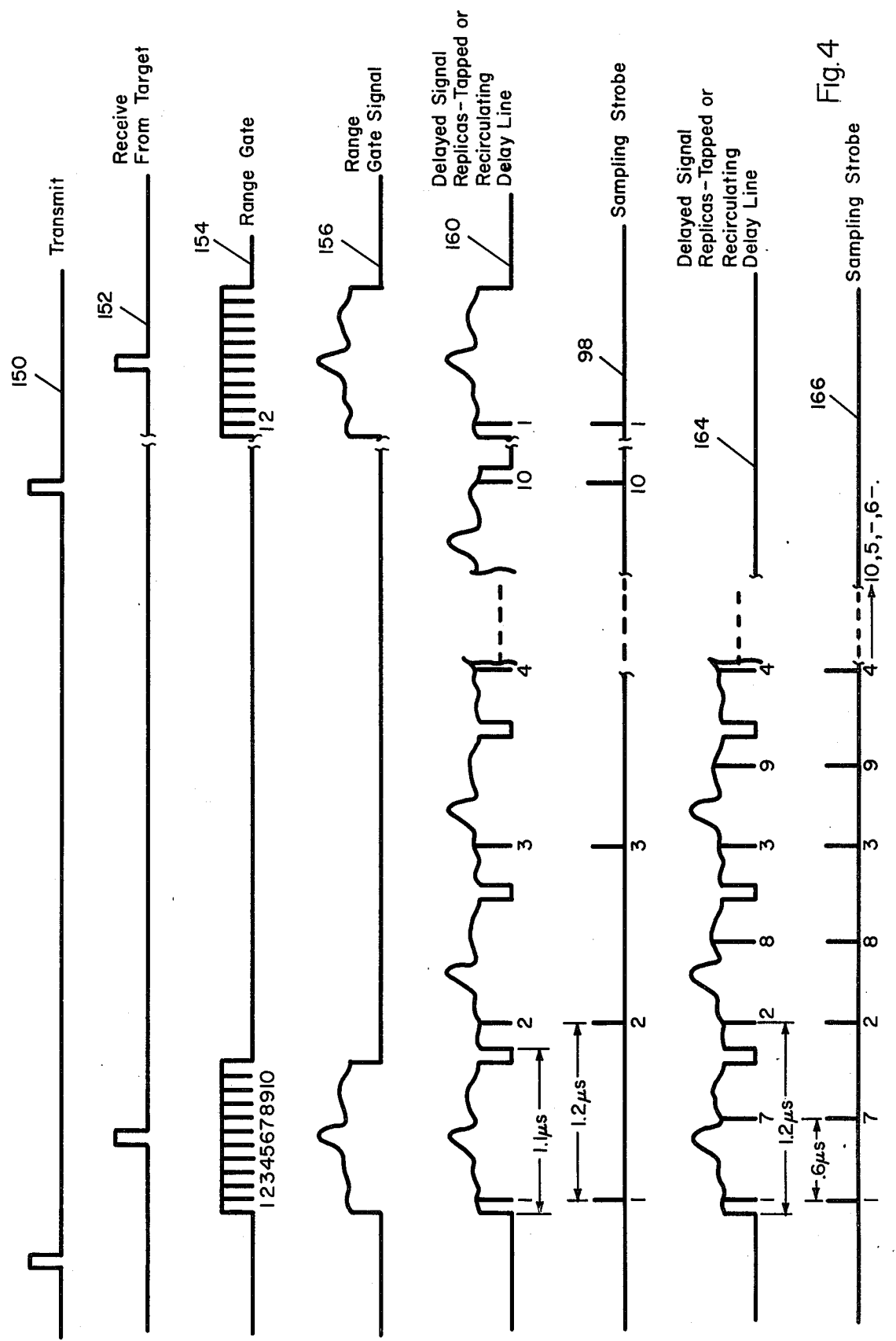
FIG. 4 is a diagram of waveform showing voltage as a function of time for explaining the operation of the systems of FIGS. 1 and 2.

Referring now back to FIG. 1 as well as to FIG. 4 an example is shown to illustrate the principles of the invention. In an active system such as the radar system the transmitted pulse of a waveform 150 is transmitted into space either with or without pulse compression and upon reception after reflection from an object is received or is decoded to a pulse shown by waveform 152. Although the principles of the invention are not limited to any bandwidth or pulse timewidth the pulses of the waveform 150 and 152 are illustrated as a wideband intermediate frequency signal at a 10 megacycle MC bandwidth and having a pulse width of approximately 0.1 microseconds. In response to the tracker gate, the signal is timed duration limited or range gated as shown by a waveform 154 which pulse is illustrated as having a width of 1.0 microseconds. Because in the example it is desired to sample at 0.1 microsecond intervals which is the input sample rate, the pulse of the waveform 154 shows 10 samples marked 1 to 10, which samples provide data from the target pulse of the waveform 152 irrespective of its position within the range gate. The range gate signal having the high amplitude target therein is shown by a pulse of a waveform 156. When the signal of the waveform 156 on the lead 48 is applied to the tapped delay line 50, 10 delayed signal replicas of a waveform 160 are generated as the signal of the waveform 156 is propagated through the delay line. The sampling and measurement device for illustration can only sample the device once every twelve of the short 0.1 microsecond time intervals. The spacing between taps on each side of segments such as 51, 53 is selected as 1.1 microseconds which is equal to the number of times a signal is sampled in each section times the output sampling interval minus the high speed or input sample interval or 1 times 1.2 minus 0.1 which is equal to 1.1 microseconds. The taps of the delay line are spaced apart by nine of the smaller intervals. The delayed signal or replicas of the waveform 160 are thus repeated 10 times (the original signal and nine delays as illustrated) and in response to the sampling strobe of a waveform 98, the samples 1 to 10 are received in sequence to lead 56 for being applied to A to D unit 100. The output sampling interval equals the delay/tap ± the input sampling interval, all divided by N which is the number of samples per replica. In the current example, the output sampling interval was 1.2 microseconds which is the 1.1 microseconds delay per tap plus the 0.1 microsecond input sampling interval. If the output sampling interval was chosen as 1.0 microseconds representing the 1.1 microseconds delay per tap minus the 0.1 microsecond input sampling interval, the sampling order would have started with segment 10 and finished with segment one. It is to be noted that in the illustrated delay line 50 of FIG. 1 the input signal is sampled prior to entering the delay line and the output signal is sampled as well as the signal at the taps, but other suitable arrangements may be utilized such as only sampling after the signal has entered the first delay line section.

Also in accordance with the principles of the invention it is not necessary that only one sample be taken from each delayed signal replica. For example if the sampling were at six of the smaller time intervals (0.6 $\mu$seconds) rather than 12 as allowed by a selected A to D converter, the first and seventh sample could be obtained from the undelayed signal, the second and eighth from the first delayed replica and so on. This arrangement only requires six signal replicas or a delay with six taps including the input and output, for example, that is five delay sections such as 51 and 53. As shown by a waveform 164, six replicas are formed from six taps and the sampling strobe of a waveform 166 at 0.6 $\mu$second intervals thus provides a sequence of samples of 1, 7, 2, 8, 3, 9, 4, 10, 5,-, 6,-, where the dashes represent unused data such as occurring between replicas. Similarly, if 0.5 microsecond sampling is used, the sampling sequence is 5, 10, 4, 9, 3, 8, 2, 7, 1, 6. For this case five replicas or four delay line segments are required. The predetermined sequence is then utilized in the memory 112 for storing in a correct time sequence, reading out the sample data in a correct time sequence or for directly utilizing the data, depending on the type of system.

For further understanding the principles of the invention, consider a sampling device operating with sampling intervals of 4 microseconds and a signal delay line input of which it is desired to sample at 0.5 microsecond intervals. Consider also that the time duration or range gate interval over which it is desired to sample the signal is 12 microseconds. By placing a tapped delay line with seven delay segments of 12.5 microseconds each between the signal source and the sampling device and by summing the tapped outputs as well as input and output of the delay line to provide the input to the sampling device, the sampling device may sample at 4 microsecond intervals yet sample the signal at the effective 0.5 microsecond interval. In this example, the eighth, 16th and 24th 0.5 microsecond intervals are sampled first from the tap at the input to the line. Four microseconds after sampling the 24th interval the second interval arrives at the sampling device via the first tap on the delay line. The sequence then continues with sample intervals 7, 15, 23, 6, 14, 22, 5, 13, 21, 4, 12, 20, 3, 11, 19, 2, 10, 18, 19, 17. Thus, once the parameters are selected a relatively short line may be utilized with a minimum number of sections by sampling the signals out of sequence. It is to be noted that the total delay of the delay line 50 must be at least the total number of samples minus the number of samples per replica times the slow rate sampling interval if the taps are used only once and in all cases the taps must be at least as far apart as the total interval we wish to sample for the width of the range gate. The illustrations of FIG. 4 are for starting the sampling at the earliest in time sample points of the input signal.

Referring now to FIG. 2 as well as to FIG. 4 the recirculating delay line arrangement in accordance with the invention will be explained in further detail. Because the delay line 144 in the illustrated arrangement may be considered equal to the delay between two adjacent taps of the continuous delay line 50 of FIG. 1, the nine delayed signal replicas of the waveform 160 are formed in a similar manner. The sampling strobe of the waveform 98 thus provides the 10 samples of the signal in sequence as discussed relative to FIG. 1. In this arrangement of 10 delayed signals, the gating pulse provided by the flip flop 137 is equal to the time width of the tracker gate. Also if more than one sample is taken during the period of each delay replica as shown by the illustrative example of the waveform 164 the strobing pulses of the waveform 166 provides the samples on the lead 56 in the same sequence shown on the waveform 166 as discussed relative to FIG. 1. It is to be noted that in the arrangement of FIG. 2 careful selection of the matched termination unit structure 136 is required in order to prevent reflection back into the delay line 144. In the arrangement illustrated by the waveforms 164 and 166 the recirculating gate provided by the flip flop 137 is selected by the value in the register 143 to have a duration of six delay intervals or 6.6 μseconds.

Referring now to FIG. 5 as well as to FIGS. 1 and 2, the operation will be further illustrated when the sample strobe is selected to start sampling of the input signals and the subsequent signal replicas at the later in time portion or portions of the gated input signal rather than the first in time portions as illustrated in FIG. 4. For the illustrated example of a total of 10 signal replicas (including the input signal to the delay line) of a waveform 180 for either the system of FIG. 1 or FIG. 2, the sampling sequence is samples 10 to 1 in response to the sample strobe pulses of a waveform 182. When the number of delay sections or recirculations is five, the delayed replicas of a waveform 184 are formed when sampling is started such that the last sample of the first replica is at the last sample point in time or sample 10. In response to the sample strobe pulses of a waveform 186 the sample sequence is 5, 10, 4, 9, 3, 8, 2, 7, 1, 6.

It is to be understood that the illustrated examples of the sample sequences as well as the arrangement of the taps or the number of recirculations are only examples and other operable sample sequences and numbers of taps and recirculations are within the scope of the invention. The common output lead from the recirculation system of FIG. 2 is not to be limited to being coupled to the input of the delay line but may alternately be coupled to the output of the delay line, all within the scope of the invention. In the systems of the invention, it is also to be understood that the strobe period for A to D sampling may be any integral number of input sample intervals greater than the selected delay period of a section of the delay line (FIG. 1) or the delay line of the recirculation arrangement (FIG. 2). Thus there has been described a delay line sampling unit that allows sampling of a wideband signal at a slower rate than would normally be allowed by sampling circuits such as the A to D converting circuits, thereby permitting the use of slower and less costly sampling devices. The system operates either at video or intermediate frequencies or any suitable frequency and is applicable to either coherent or noncoherent data and to use of data from either active or passive type systems. A tapped or recirculating delay line is used to present the signal to the sampling circuits at a rate consistent with the sampling rate capability of the device but such that the effective time space between signal samples is less than and consistent with the bandwidth of the signal. The principles of the invention include utilizing delay lines operating at various bandwidths and frequencies which may be either tapped or untapped delay lines. Also the principles of the invention include for tapped delay lines either developing the samples in the input time sequence or developing the samples with a shortened delay line out of sequence which sequence is predetermined and allows separating of the signals at the output.

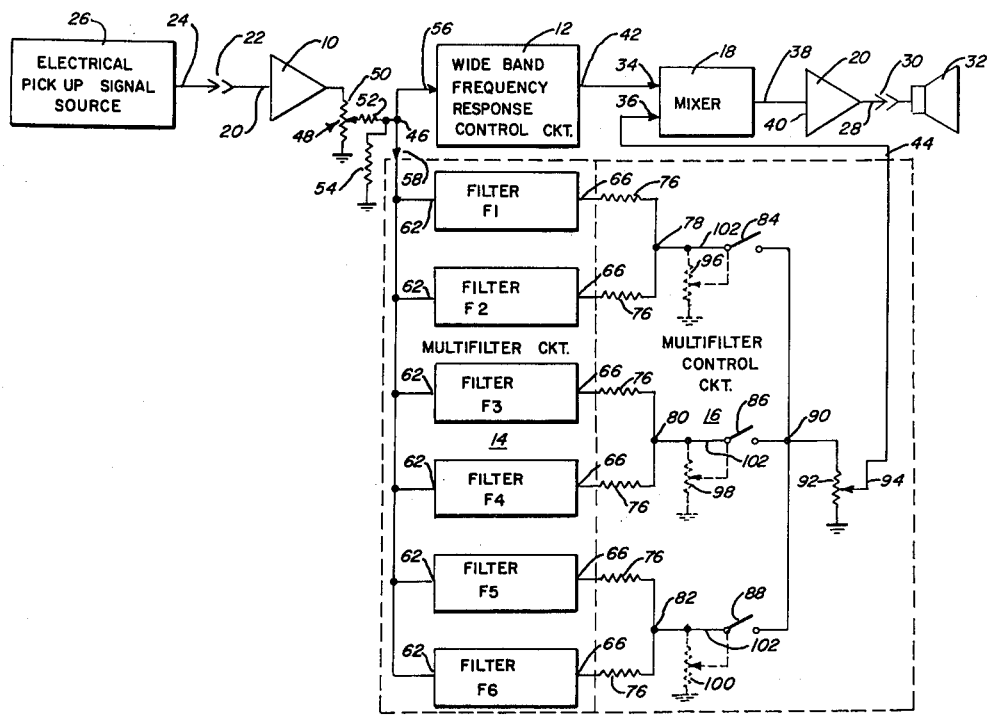

What is claimed is:

1. A signal sampling system responsive to an informational input signal comprising:
   a time gate responsive to said informational input signal for time gating said input signal over a selected interval having a predetermined sample sequence of sample intervals over said gating interval,
   delay means responsive to said time gated informational input signal for forming a selected number of delayed signal replicas of said informational signal thereof and having an output lead; and
   sampling means including strobing means coupled to said output lead of said delay means for sampling said delayed signal replicas at predetermined intervals, said sampling having a predetermined sequence relative to the sample sequence of said time gated input signal.

2. The combination of claim 1 in which said delay means includes a tapped delay line having a selected number of taps between delay sections to sample a portion of said time gated signal more than once from each signal replica.

3. The combination of claim 2 in which said delay sections each provide a delay that is greater than the time duration of each signal replica by an interval that is an integral number of said predetermined sample intervals.

4. The combination of claim 2 in which said sampling means includes means for sampling said signal replicas at intervals that are less than the delay of each of said delay sections by an integral number of said sample intervals of said input signal.

5. The combination of claim 1 in which said delay means includes a delay line responsive to said input signal and a feedback loop coupled from the output of said line to the input for forming a selected number of said delayed signal replicas with the input of said line coupled to said sampling means.

6. The combination of claim 5 in which the time gated input signal has a predetermined sample interval and in

United States Patent [19]

Moog

[11] 4,117,413
[45] Sep. 26, 1978

[54] AMPLIFIER WITH MULTIFILTER

[75] Inventor: Robert A. Moog, East Aurora, N.Y.

[73] Assignee: Norlin Music, Inc., Lincolnwood, Ill.

[21] Appl. No.: 808,494

[22] Filed: Jun. 21, 1977

[51] Int. Cl.² .............................................. H03F 3/68
[52] U.S. Cl. .................................... 330/126; 84/1.11;
84/1.22; 330/51; 330/151
[58] Field of Search ................. 330/51, 107, 109, 126,
330/151, 295, 303, 306; 84/1.11, 1.16, 1.19,
1.22, 1.24, DIG. 9

[56] References Cited

U.S. PATENT DOCUMENTS

| | | | |
|---|---|---|---|
| 2,709,206 | 5/1955 | Ferguson | 330/126 X |
| 3,493,669 | 2/1970 | Elbrecht et al. | 84/1.11 UX |
| 3,566,294 | 2/1971 | Takahashi | 330/126 |
| 3,750,044 | 7/1973 | Stanley | 330/126 |
| 3,752,928 | 8/1973 | Flickinger | 330/126 X |

*Primary Examiner*—James B. Mullins
*Attorney, Agent, or Firm*—Ronald J. Kransdorf; Jack Kail

[57] ABSTRACT

In an audio amplifier for amplifying signals from an electric guitar or the like having a conventional tone control circuit for selectively emphasizing input signals in the bass, middle and treble frequency ranges of the instrument, a multifilter circuit for emphasizing input signals with frequencies in selected, relatively narrow, frequency bands in the upper portion of the frequency spectrum to minimize aural fatigue. The multifilter circuit comprises a plurality of parallel connected, two-pole, resonant filter sections with different, relatively narrow, resonant frequency bands separated from one another by an amount on the order of ¼ octave and forms a signal path that supplements the signal path provided by the conventional tone control circuit. The signals produced on the output of the tone control circuit are mixed with the multifilter output signals. Potentiometers are provided to vary the amplitude of the output signals of the entire multifilter circuit or selected ones of the filter sections thereof. Both the amplitude and phase frequency response of the multifilter are characterized by a plurality of successive peaks and dips, such that as the musician plays different notes, certain number of harmonics are emphasized in some notes, while other harmonics are emphasized in other notes with respect to amplitude while variations in the pitch or frequency of the input signal result in the phases of the individual harmonics to be rapidly shifted which causes minute shifts in the pitch of the individual harmonics produced on the output.

13 Claims, 5 Drawing Figures